United States Patent [19]

Manservisi et al.

[11] Patent Number: 4,530,199
[45] Date of Patent: Jul. 23, 1985

[54] DISCARDING DEVICE FOR DISCARDING DEFECTIVE CIGARETTE PACKS

[75] Inventors: Renato Manservisi, Bologna; Roberto Roffi, Casalecchio di Reno, both of Italy

[73] Assignee: SASIB S.p.A., Bologna, Italy

[21] Appl. No.: 378,820

[22] Filed: May 17, 1982

[30] Foreign Application Priority Data

May 19, 1981 [IT] Italy .............................. 12529 A/81

[51] Int. Cl.³ .............................................. B07C 5/02
[52] U.S. Cl. ...................................... 53/53; 209/536; 53/64
[58] Field of Search ..................... 53/53, 505, 506, 65, 53/137, 64; 209/536, 535, 917, 912

[56] References Cited

U.S. PATENT DOCUMENTS

| | | | |
|---|---|---|---|
| 2,991,879 | 7/1961 | Innocenti | 209/535 X |
| 3,067,873 | 12/1962 | Petts et al. | 209/535 X |
| 3,170,572 | 2/1965 | Harrison | 209/535 X |
| 3,270,881 | 9/1966 | Calhoun | 209/536 X |
| 3,456,773 | 7/1969 | Titmas, Jr. | 198/20 |
| 3,721,340 | 3/1973 | Kruse et al. | 209/536 |
| 3,930,994 | 1/1976 | Conway et al. | 209/536 X |
| 3,939,984 | 2/1976 | Butner et al. | 209/536 |
| 3,956,110 | 5/1976 | Seragnoli | 209/535 X |
| 4,053,056 | 10/1977 | Day | 209/536 X |
| 4,248,389 | 2/1981 | Thompson et al. | 209/564 |
| 4,249,661 | 2/1981 | Lem | 209/564 |
| 4,253,573 | 3/1981 | Dubberly et al. | 209/525 |

Primary Examiner—James F. Coan
Attorney, Agent, or Firm—Spencer & Frank

[57] ABSTRACT

A discarding device (1) for discarding cigarette packs (PS) not provided with a label or duty stamp (T) comprises an operational endless conveyor (4) driven step by step and carrying a plurality of open containers (5) each adapted to receive one cigarette pack (P).

Loading means are provided to load sequentially into said containers (5) the packs (P) not yet provided with labels; and, spaced with respect to one another according to the feed steps of the intermittent conveyor (4), there are provided: a labelling station (S1) where the labels (T) are applied to the packs (P) in the containers (5), a checking station (S2) to detect the presence of the label on a pack, a discard conveyor (2) to discharge the unlabelled packs (PS), and a transfer conveyor (3) to convey the regular (i.e. labelled) packs (P) from a operational conveyor (4) to a further delivery conveyor (22, 23, 24).

The discard conveyor (2) and transfer conveyor (3) for the packs (P, PS) consist each of a guided sliding path (6, respectively 7) for the packs, disposed transversely to said intermittent operational conveyor (4), suitably related to the respective dwell stations of the containers (5).

5 Claims, 2 Drawing Figures

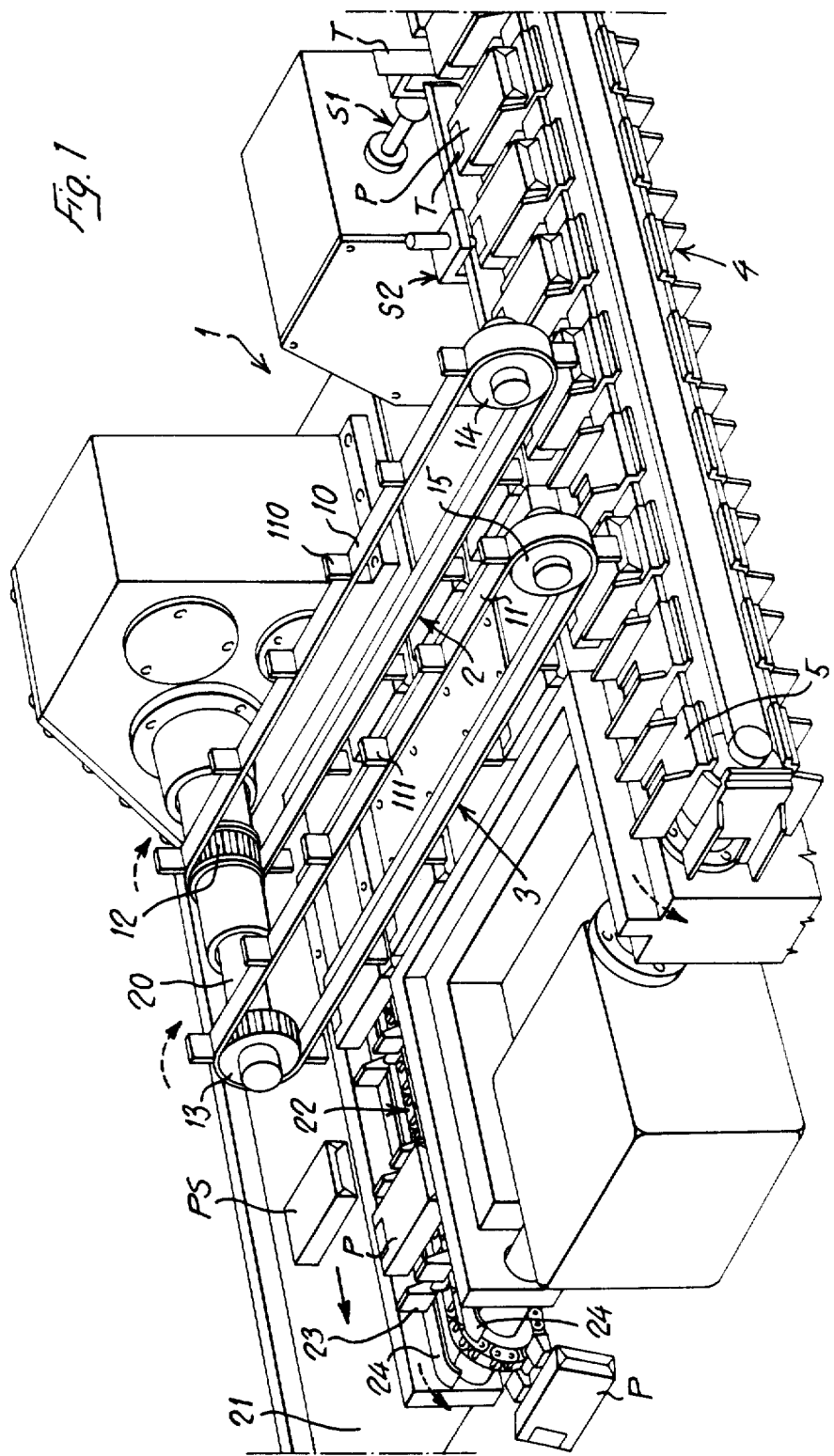

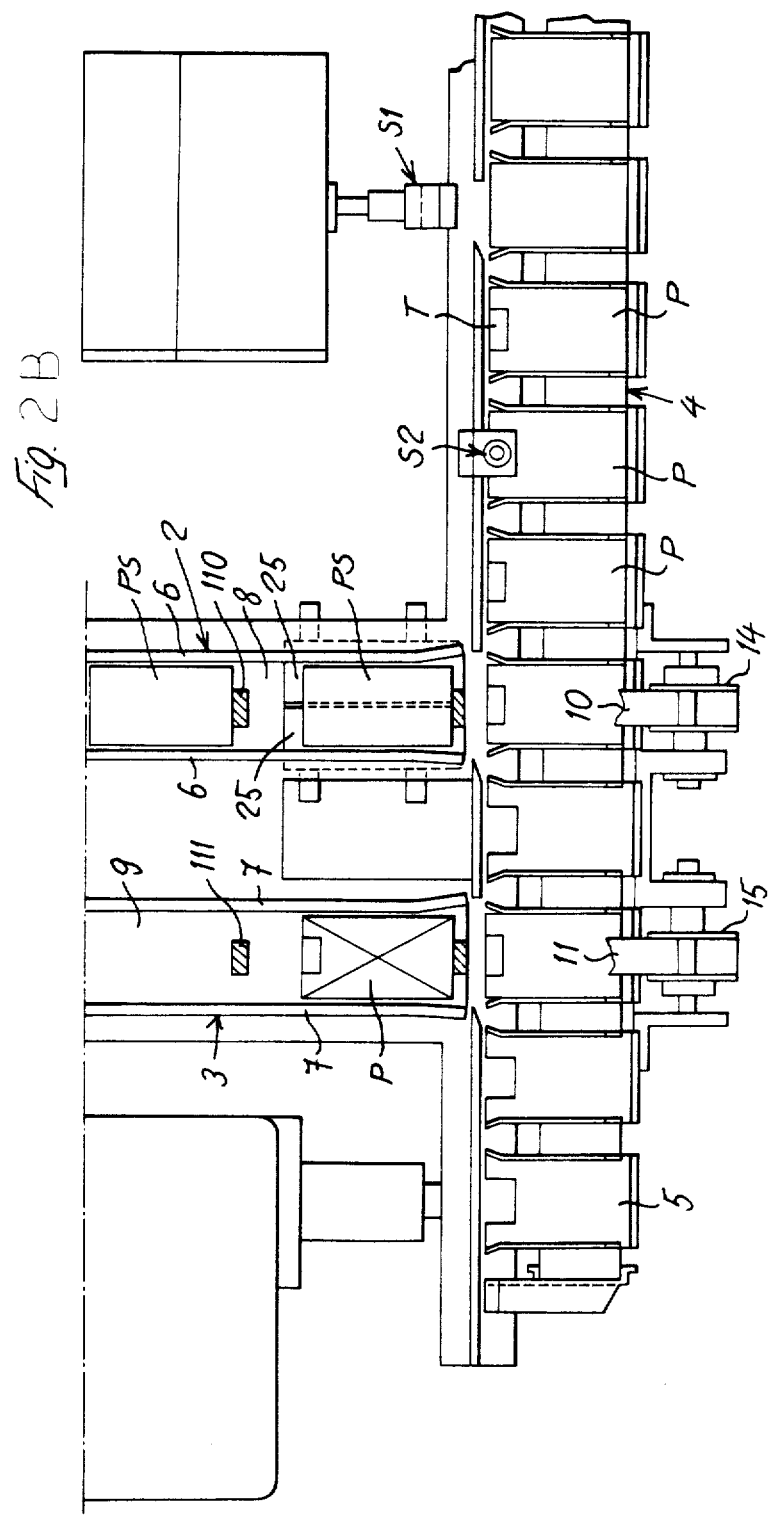

DISCARDING DEVICE FOR DISCARDING DEFECTIVE CIGARETTE PACKS

SUMMARY OF THE INVENTION

This invention relates to the packaging of orderly arranged groups of cigarettes in soft wrappers, so-called American wrappers, by means of intermittently-operating packaging machines, wherein said groups are wrapped, successively one by one, in a twofold wrapper, the inner fold of which is of tin foil and the outer fold of paper, and finally a label is glued, usually for duty charges, over the top edges of the outer paper fold so as to bridge transversely over the head of the finished pack.

In this type of packaging of cigarette packs, the object of the invention is to provide, particularly, a device for selectively and automatically discarding the packs which have not been provided with said labels, which packs will be called briefly "defective packs".

In order to discard these defective packs, some discarding devices have been proposed wherein, after receiving the labels, the packs are advanced in face-to-face abutting relationship in an orderly row along a first channel.

At the outlet of the first channel, a transfer pusher will transfer sequentially each successive leading pack into a second channel, perpendicular to the first channel, where it is examined by a sensor which detects either the presence or the absence of the label.

At the successive feed step in the second channel, each examined pack is brought opposite the inlet of a discharge channel which is parallel to the first channel, and if the pack is regular, i.e. if its wrapper has been duly labelled, a second transfer pusher will move it into said discharge channel.

If, however, the examined pack is found unlabelled, it proceeds in the step by step movement along the second channel to be finally discharged into a container for the discarded packs.

In the known discarding devices of the type just specified above, an inconvenience can occur, especially when said first channel is of considerable length.

Basically, this inconvenience can be summarized as follows: In the row which is fed along the first channel, each pack is advanced by the pushing action of the pack therebehind; therefore, if the packs in the row are great in number and of scarce consistence (soft packs, as desired by smokers), the row of packs will undergo some tamping, so that the respective transfer pusher which is to transfer each leading pack sequentially into the transverse channel can also pinch and damage the pack therebehind.

This invention is directed to eliminate this inconvenience, and for this purpose it provides a device for selectively discarding the defective packs, i.e. the packs not provided with a label or duty stamp, from a timed flow of such packs. This device comprises an operational endless conveyor driven intermittently step by step and carrying throughout its length an orderly plurality of containers, uniformly opened at one side and at the top, said containers being adapted to receive each a cigarette pack to be labelled, and being equally spaced between each other and in phase-relationship with the step by step movement of the conveyor; loading means to load sequentially into said containers the packs not yet provided with labels; and a labelling station where the labels are applied to the packs in the containers, a checking station to detect the presence of a stuck label, a discard path to discharge the unlabelled packs from the intermittent conveyor, and a transfer path to convey the labelled packs from said conveyor containers to further delivery means such as a further intermittent conveyor.

In the sequential discarding device described briefly above, said discard path and transfer path consist of guided paths permitting the sliding movement of transversely-disposed packs from said operational intermittent container-carrying-conveyor, in phase-relationship with the dwell positions of the containers thereof, said guided paths being associated with respective intermittent transfer means which are adapted to operate regularly, respectively at intervals for the packs to be discarded, interposed in the dwell intervals of the intermittent conveyor, to remove therefrom either the regular packs and the defective packs, along different, guided, intermittent transfer paths.

BRIEF DESCRIPTION OF THE DRAWINGS

These and other characteristics of the invention and the advantages resulting therefrom will be apparent from the following detailed description of a preferred embodiment thereof, given as a non limiting example, with reference to the accompanying drawings, in which:

FIG. 1 is a perspective view of a discarding device for discarding defective, i.e. unlabelled, cigarette packs according to a preferred embodiment of the invention; and FIGS. 2A and 2B are two parts of a top plan view of the device of FIG. 1.

DESCRIPTION OF THE PREFERRED EMBODIMENT

Figure 2A:
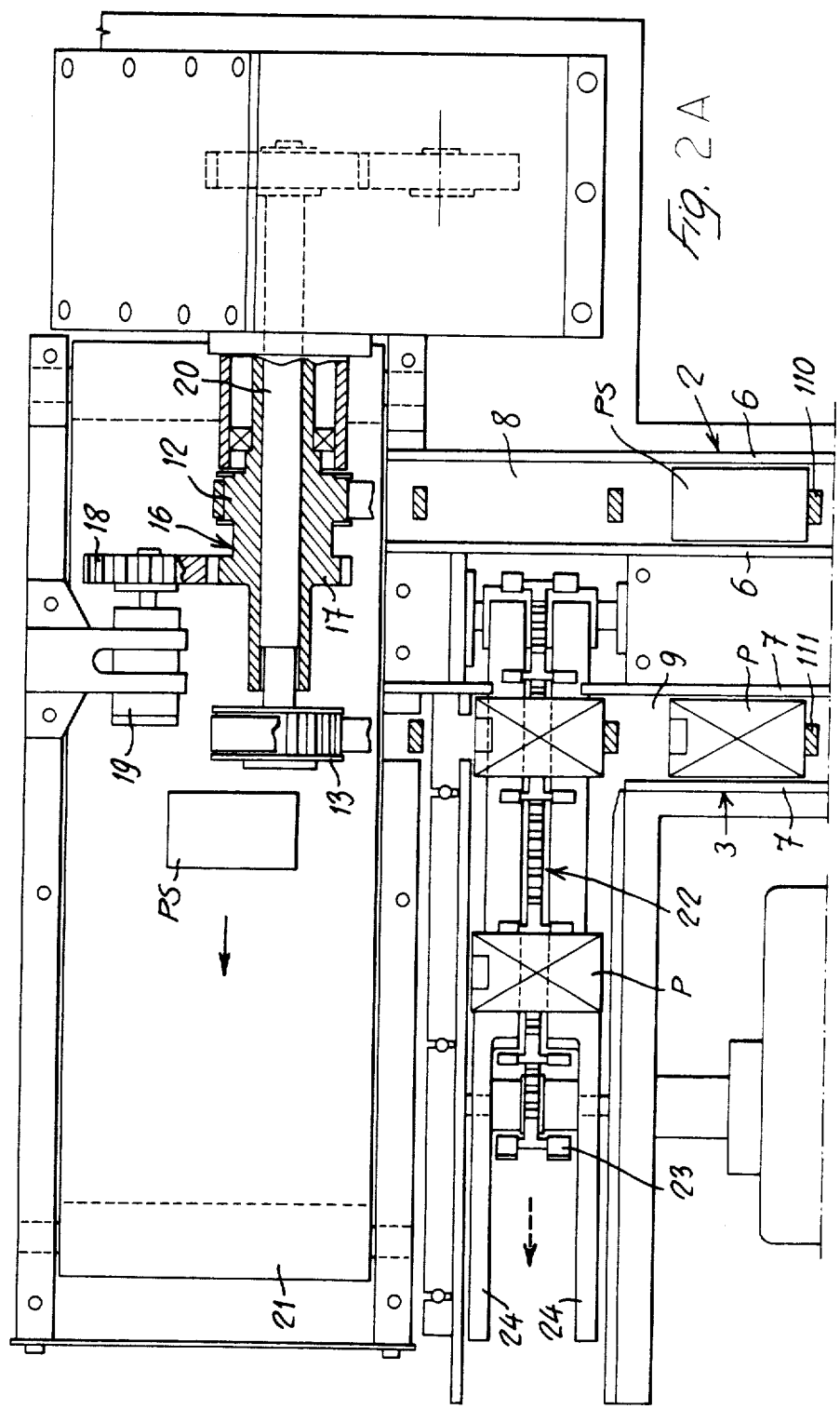

With reference to the drawings, the discarding device according to the invention comprises a pair of conveyor channels 2, 3 parallel to each other and both at the same level, which are arranged perpendicularly to an endless conveyor 4 comprising an endless supporting element having an intermittent movement and carrying a plurality of equally-spaced small boxes or containers 5 each of which can receive a finished pack P.

The channel 2 is defined at both sides by ridge members 6, at the bottom by a sliding guide 8, and at the top by the lower run of an endless belt 10 which is arranged around a driving pulley 12 and a driven pulley 14 and which carries a plurality of equally-spaced cross members 110.

Similarly, the channel 3 is defined at both sides by ridge members 7, at the bottom by a sliding guide 9, and at the top by the lower run of an endless belt 11 which is arranged around a driving pulley 13 and a driven pulley 15 and which carries a plurality of equally-spaced cross members 111.

The driving pulley 12 of the belt 10 is formed on a sleeve 16 which is integral with a gear member 17 meshing with a gear wheel 18 which is keyed on the shaft of a step-motor 19.

The driving pulley 13 of the belt 11 is keyed on a shaft 20 which is passed through the bore of the sleeve 16. The belt 11 is driven intermittently by suitable driving means, for example by a Maltese-cross device or by a globoidal cam device, in opposed-phase relation with respect to the intermittent movement of the endless conveyor 4, and it stops during each stepping movement of said conveyor.

On the other hand, the feed motion of the belt 10 is effected at discontinuous time intervals, as described hereinafter, in synchronous and phased relation with the motion of the belt 11.

Cooperating with the channel 2, at the outlet end, is a continuously-driven perpendicular conveyor belt 21.

Cooperating with the channel 3 is a perpendicular chain conveyor 22 with equally-spaced pushing lugs 23 and sliding guides 24.

Said chain conveyor 22 is actuated by a Maltese-cross device or a globoidal cam device (not shown) in synchronous and phased relation with the intermittent motion of the belt 11.

The discarding device described above operates as follows.

During the dwell step of the conveyor 4 at the station S 1, a labelling device sticks a label or duty stamp T on a pack P housed in the container 5.

Thereafter, at the station S 2, an optical detector, for example a reflection-type photocell, detects the presence of the label T on the pack P, and in case of absence of the label it issues a discard signal which is suitably stored in a memory means.

When the defective pack P arrives opposite the inlet of the discard channel 2 for the defective packs, in the respective dwell period of the conveyor 4, the motor 19 causes a one-step feed movement of the belt 10 so that its cross-member 110 engages a pack PS to be discarded and transfers it into the channel 2.

As stated above, this movement takes place in phased relation with the movement of the belt 11, and the cross-member of the latter will transfer into the channel 3 one regular pack P lying opposite the inlet of said channel. The belts 10, 11, which are shown in the drawings as plain belts, are actually toothed belts of the type usually known as "timing belts".

By the step-by-step feed movement, a regular pack P in the channel 3 is transferred onto the sliding guides 24 of the chain conveyor 22.

During the dwell period of the belt 11, the pushing lug 23 advances the pack P one step along the guides 24 in order to feed it, for example, to a cellophaning machine so as to complete the packaging.

Any defective pack PS in the channel 2 is advanced one step each time a new defective pack is introduced into said channel, and is finally transferred onto the conveyor belt 21 which will discharge it into a suitable container for discarded packs.

A further characteristic feature of the invention resides in the fact that the sliding guide 8 at the inlet of the channel 2 is formed by two turnover members 25 which under the control, for example, of an electro-magnet or a pneumatic cylinder are swung downwardly, if required, so as to form a trap door or swing-door in said sliding guide.

If the products are to be checked, one or more regular packs are sent, by a suitable control, into the discard path and, through said pitfall, they will fall into a suitable sampling container.

By means of above described discarding device, the packs to be checked are fed intermittently into the spaced carrying containers of an endless step-by-step conveyor.

This arrangement eliminates the drawbacks of the known discarding devices in which the packs are advanced along the first channel in abutting relationship to each other. In this case, especially if this channel is of considerable length and the packs are of scarce consistence and great in number, the major drawback occurring usually is that the row of packs will undergo some tamping, whereby the device for transfering the leading pack into the perpendicular channel can pinch the pack therebehind.

Of course, the invention is not limited to the embodiment just shown and described by way of example, but broad changes and modifications can be made thereto, without departing from the basic inventive principle, as set forth above and as claimed hereinafter.

I claim:

1. A discarding device for discarding cigarette packs which have not been provided with a label or duty stamp, from a cadenced flow of such packs, characterized by the fact that said device comprises an operational endless feeding conveyor (4) driven step-by-step, said conveyor (4) carrying an orderly plurality of open seats or containers (5) each adapted to receive one cigarette pack and which are equally-spaced with respect to each other and in phase relationship with the step-by-step movement of the conveyor (4); a labelling station (S1) where the labels are applied to the packs in the containers; a checking station (S2) to detect the presence of the label on a pack, a discard conveyor (2) for discharging the unlabelled packs from the feeding conveyor, and a transfer conveyor (3) to convey correctly labelled packs from the operational feeding conveyor to a further delivery conveyor (22); said discard conveyor and said transfer conveyor being arranged transversally with respect to the said operational feeding conveyor, and being operationally controlled so as to operate in the dwell periods of the step-by-step movement of the feeding conveyor for causing said discard conveyor to remove from said containers the unlabelled defective packs to be discarded and said transfer conveyor to remove the regular correctly labelled packs to be fed to the further delivery conveyor.

2. A discarding device according to claim 1, in which said labelling station (S1), said checking station (S2), said discard conveyor (2) and said transfer conveyor (3) are sequentially arranged along the path of the operational feeding conveyor (4) in the conveying direction of said feeding conveyor, and are spaced with respect to one another in accordance with the feed step of the said feeding conveyor.

3. A device according to claim 1, in which the feeding conveyor (4) and the delivery conveyor (22) consist of endless conveyors each having an active run which is arranged below the motion path of the cigarette packs, in such a manner as to actually carry the packs, while said discard conveyor (2) and the said transfer conveyor (3) are constructed as dragging conveyors, acting on the cigarette packs from above.

4. A device according to claim 3, in which the transfer conveyor (3) and the discard conveyor (2) comprise each a slide guide on which the packs can slide, and an overlying endless belt provided with a plurality of cross members arranged so as to engage the packs in the containers of the feeding conveyor and to move the packs over and along the respective slide guide.

5. A device according to claim 1 further comprising means defining a trap door in said transfer conveyor for the selective removal from said transfer conveyor of packs to be inspected.

* * * * *